3,769,366
POLYESTERIMIDES FROM CAPROLACTAM-TRIMELLITIC ANHYDRIDE REACTION PROUCTS DISSOLVED IN UNSATURATED MONOMERS

William A. Fessler, Albany, and Henry A. Wroblewski, Schenectady, N.Y., assignors to General Electric Company
No Drawing. Filed Apr. 13, 1972, Ser. No. 243,873
Int. Cl. C08g 41/04
U.S. Cl. 260—857 PA          9 Claims

ABSTRACT OF THE DISCLOSURE

Solventless encapsulating varnishes convertible to hard glassy solids are provided. The solventless varnishes employ aliphatically unsaturated organic diluents, such as vinyl toluene, in combination with a curable polyester imide reaction product derived from trimellitic anhydride, caprolactam, a glycol, such as neopentyl glycol, and an aliphatically unsaturated dicarboxylic acid or anhydride.

---

The present invention relates to solventless pollution free varnishes which can be employed to encapsulate and insulate motor windings. More particularly, the present invention relates to the product of reaction derived from the melt polymerization of trimellitic anhydride and caprolactam, allowing for the production of curable reaction products free of volatile organic solvent.

Organic varnishes useful for imparting improved insulating characteristics to conductors or electrical devices such as motor windings, etc. have generally been accepted by the electrical industry because these cured resins generally exhibited superior temperature resistance over extended periods of time. Recently, increased emphasis has been placed on the development of solventless resins for encapsulating and insulating purposes, because of the air pollution which results when varnishes are made with organic solvents which must be eliminated prior to the cure of the resin.

The present invention is based on the discovery that pollution free varnishes can be made by co-melting substantially equal molar amounts of trimellitic acid anhydride and caprolactam to produce a dicarboxylic acid reaction product, which provides the basis for building a polyester imide structure having aliphatic unsaturation in the backbone. The aforementioned polyester imide can thereafter readily be dissolved in a suitable free radical reactive aliphatically unsaturated organic solvent having volatility characteristics which minimize its evaporation during the cure of the varnish, which can be effected by the employment of an organic peroxide by conventional procedures.

There is provided by the present invention, a solventless varnish comprising by weight,
(A) From 0 to 60% of an aliphatically unsaturated organic solvent, and
(B) 40 to 100% of a polyester imide reaction product of equal moles of,
(a) glycol, and
(b) dicarboxylic acid consisting essentially of
 (i) from 10 to 90 mole percent of an aliphatically unsaturated organic dicarboxylic acid or acid anhydride and
 (ii) from 90 to 10 mole percent of the melt reaction product of substantially equal moles of trimellitic anhydride and caprolactam, where (B) is made by effecting reaction between (i) and the reaction product of (a) and (ii).

Included by the aliphatically unsaturated dicarboxylic acid anhydrides which can be employed in the practice of the invention to make the polyester imides are maleic anhydride, citraconic anhydride, tetrahydrophthalic anhydride, 3,6-endomethylene 1,2,3,6-tetrahydrophthalic anhydride, etc. Included by the aliphatically unsaturated dicarboxylic acids are for example, fumaric, maleic, itaconic, citraconic, coconut oil, linseed fatty acid, etc.

Glycols, or aliphatic compounds containing two OH groups, are any branched or linear glycols having from 1 to 20 carbon atoms which can be utilized in the practice of the present invention, to make the solventless varnishes, such as ethylene glycol, propylene glycol, neopentyl glycol, diethylene glycol, the monoester, such as the linseed fatty acid monoester, of tris(2-trihydroxyethyl)isocyanurate, tris(2-hydroxyethoxy)triazine, etc.

The aliphatically unsaturated organic solvents which can be employed in combination with the polyester imide reaction product to produce the solventless varnishes of the present invention are for example, styrene, vinyl toluene, diallyl isophthalate, triallylbenzene, etc.

The solventless varnishes of the present invention can be cured by utilizing from 0% to 5% by weight of a free radical initiator, such as: benzoyl peroxide, dicumyl peroxide, tert-butylperbenzoate, methylethyl ketone peroxide, etc.; ultraviolet light and ionizing radiation can be employed.

There is also provided by the present invention, a method for making a solventless resin which comprises the steps of:

(1) Effecting reaction between substantially equal molar amounts of trimellitic acid anhydride and caprolactam.

(2) Effecting reaction between the product of (1) and a glycol, utilizing from 10 mole percent to 90 mole percent of excess glycol over the mole percent of the reaction product of (1) in the resulting mixture.

(3) Effecting reaction between the product of (2) and an aliphatically unsaturated organic dicarboxylic acid or acid anhydride, using amounts sufficient to esterify substantially all of the free hydroxy radicals in the resulting mixture.

(4) Dissolving the reaction product of (3) in an aliphatically unsaturated organic liquid having a boiling point of at least 60° C. to produce a varnish having up to 60% by weight of solvent.

In the practice of the invention the substantially equal molar amounts of trimellitic acid anhydride and caprolactum are heated until a melt of the ingredients is formed and the mixture is stirred to facilitate reaction. The mixture is thereafter allowed to cool slowly and the glycol is added to the reaction product in excess amounts. The resulting mixture is then heated to facilitate the separation of water of reaction resulting in the esterification of the carboxy groups of the trimellitic acid anhydride caprolactam reaction product. There is then added to the resulting mixture, aliphatically unsaturated dicarboxylic acid or anhydride and the resulting mixture is heated over a sufficient period of time to effect the separation of water of reaction, which can be facilitated with the employment of azeotroping solvent. After the product is cooled sufficiently, there can be added aliphatically unsaturated organic solvent in amounts to reduce the viscosity of the aforementioned reaction product to produce a desirable varnish viscosity. The incorporation of an organic peroxide can then be effected to produce the solventless varnish curable when heated without the separation of a significant amount of volatiles, such as less than about 6% by weight.

Experience has shown that reaction of the trimellitic acid anhydride-caprolactam melt can be achieved at temperatures in the range of from 200° C. to 280 C. over a period from 1 to 2 hours depending upon the degree of agitation employed. Reaction between the resulting product and the glycol can be effected at temperatures in the range of between 150° C. to 220° C.

It has been found that removal of the water of reaction during the formation of the polyester imide can be facilitated by the employment of organic solvent and preferably an aromatic hydrocarbon solvent. Temperatures during the formation of the polyester imide can vary between 100° C. to 220° C.

The solventless varnishes of the present invention can be reinforced with a variety of conventional fillers in proportions of from 0% to 90% by weight of filler based on the weight of the resulting reinforced solventless resin composition. Suitable filler which can be utilized are for example, silica fillers, ground quartz, glass fibers, rubber fibers, etc.

In order for those skilled in the art to be better able to practice the invention, the following examples are given by way of illustration and not by way of limitation. All parts are by weight.

EXAMPLE 1

A mixture of 192 parts of trimellitic anhydride and 114 parts of caprolactam were heated to 280° C. and allowed to cool slowly to 150° C. There was then added to the mixture, 225 parts of neopentyl glycol and the resulting mixture was heated until two moles of water separated. There was then added to the resulting mixture, 196 parts of maleic anhydride at 110° C., along with 67 parts of dicyclopentadiene to produce in situ 3,6-endomethylene-1,2,3,6-tetrahydrophthalic anhydride. The mixture was cooked to an acid number of 40.9. Along with the aforementioned ingredients, there was also added 20 parts of toluene to facilitate the removal of water as an azeotrope from the mixture. After the mixture had been heated at 220° C. the batch was allowed to cool to 110° C. and 0.2 parts of quinone dissolved in 4 parts of vinyl toluene was added. There was then added an additional 250 parts of vinyltoluene to reduce the viscosity of the resulting varnish, along the 6.4 parts of cobalt naphthylene.

There was added to the above described solventless varnish about 1% by weight of dicumyl peroxide. The resulting mixture was then cured at 100° C. for 4 hours to give a hard glassy solid.

The total weight loss of the solventless resin during cure was less than 6% by weight, based on the total weight of the varnish.

EXAMPLE 2

A mixture of 192 parts of trimellitic anhydride and 114 parts of caprolactam were cooked in the absence of an organic solvent up to 250° C. for 3 hours. The mixture was then allowed to cool to 160° C. and there was added 477 parts of a monoester of a triol resulting from the reaction of propylene oxide and tris(hydroxyethyl)isocyanurate, along with 200 parts of linseed fatty acid. While stirring the resulting reaction mixture, 20 parts of toluene was added to the mixture at a temperature of 220° C. to facilitate the removal of water of reaction by azeotropic distillation. After about 51 parts of water had been removed, the product was allowed to cool. There was then added 240 parts of vinyl toluene, along with 10 parts of dicumyl peroxide. Based on method of preparation there was obtained a solventless varnish useful for encapsulating electronic components.

EXAMPLE 3

A mixture of 113 parts of caprolactam and 192 parts of trimellitic anhydride was cooked at a temperature between 220° C.–230° C. for 1 hour, followed by 3 minutes at 270° C. There was added to the resulting product, 208 parts of neopentyl glycol and the resulting mixture was cooked further until no further water was evolved. There was added to the resulting mixture at 100° C., 98 parts of maleic anhydride and 67 parts of dicyclopentadiene. The resulting mixture was then heated at 220–230° C. for 6 hours until there was obtained a clear brown rubber like resin.

The above polyester imide reaction product of 76 parts was blended with 24 parts of vinyl toluene along with 1 part of dicumyl peroxide to produce a curable varnish. A rotor winding wound with copper wire was dipped into the polyester imide varnish and then the resulting treated part was allowed to air dry. The treated rotor winding was then heated to a temperature of 150° C. for 4 hours. It was found that less than 6% volatiles were evolved after the treatment and during cure. The resulting treated rotor was found to possesses valuable heat stability and insulating characteristics.

Although the above examples illustrate only a few of the very many solventless varnishes which can be made in accordance with the method of the invention, it should be understood that the present invention includes a much broader class of such varnishes based on the variety of glycols and aliphatically unsaturated dicarboxylic acid which can be used.

What we claim as new and desire to secure by Letters Patent of the United States is:

1. A solventless varnish comprising by weight,
   (A) from 0 to 60% of an aliphatically unsaturated organic solvent, and
   (B) 40% to 100% of a polyester imide reaction product of substantially equal moles of,
      (a) glycol, and
      (b) dicarboxylic acid consisting essentially of
         (i) from 10 to 90 mole percent of an aliphatically unsaturated organic dicarboxylic acid or acid anhydride and
         (ii) from 90 to 10 mole percent of the melt reaction product of substantially equal moles of trimellitic anhydride and caprolactam, where (B) is made by effecting reaction between (i) and the reaction product of (a) and (ii).

2. A solventless varnish in accordance with claim 1, where the glycol is neopentyl glycol.

3. A solventless varnish in accordance with claim 1, where the aliphatically unsaturated anhydride is maleic anhydride.

4. A solventless varnish in accordance with claim 1, where the aliphatically unsaturated organic dicarboxylic acid is fumaric acid.

5. A solventless varnish in accordance with claim 1, where the glycol is a monoester of tris(2-hydroxyethyl) isocyanurate.

6. A solventless varnish in accordance with claim 1, where the glycol is a monoester of tris(2-hydroxyethoxy) triazine.

7. A solventless varnish in accordance with claim 1, where the aliphatically unsaturated dicarboxylic acid anhydride is employed as a mixture of a major amount of maleic anhydride and a minor amount of dicyclopentadiene.

8. A method for making a solventless varnish which comprises the steps of:
   (1) effecting reaction between substantially equal molar amounts of trimellitic acid anhydride and caprolactam,
   (2) effecting reaction between the product of (1) and a glycol, utilizing from 10 mole percent to 90 mole percent of excess glycol over the mole percent of the reaction product of (1) in the resulting mixture.
   (3) effecting reaction between the product of (2) and an aliphatically unsaturated dicarboxylic acid anhydride using amounts sufficient to esterify substantially all of the free hydroxy radicals in the resulting mixture.

(4) dissolving the reaction product of (3) into an aliphatically unsaturated organic solvent having a boiling point of at least 60° C. to produce a varnish having up to 60% by weight of solvent.

9. A method in accordance with claim 6, where the aliphatically unsaturated organic liquid is vinyl toluene.

References Cited

UNITED STATES PATENTS

| | | | |
|---|---|---|---|
| 3,238,181 | 3/1966 | Anderson | 260—78 L |
| 3,458,480 | 7/1969 | Schmidt | 260—75 |
| 3,562,219 | 2/1971 | Schmidt | 260—76 |

FOREIGN PATENTS

| | | | |
|---|---|---|---|
| 1,043,098 | 9/1966 | Great Britain | 260—75 N |
| 1,122,925 | 8/1968 | Great Britain | 260—75 N |

PAUL LIEBERMAN, Primary Examiner

U.S. Cl. X.R.

204—159.15; 260—37N, 41A, 41AG, 75N, 78L, 857D, 857UN